US008543129B2

(12) United States Patent
Kazmi et al.

(10) Patent No.: US 8,543,129 B2
(45) Date of Patent: *Sep. 24, 2013

(54) METHOD AND ARRANGEMENTS IN A MOBILE COMMUNICATION NETWORK

(75) Inventors: Muhammad Kazmi, Bromma (SE); Joakim Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,285

(22) Filed: Feb. 20, 2012

(65) Prior Publication Data

US 2012/0147856 A1    Jun. 14, 2012

Related U.S. Application Data

(63) Continuation of application No. 12/996,182, filed as application No. PCT/SE2009/050221 on Feb. 27, 2009, now Pat. No. 8,121,590.

(51) Int. Cl.
*H04W 72/00* (2009.01)

(52) U.S. Cl.
USPC ........ 455/452.2; 455/434; 455/736; 455/442; 455/450; 370/329; 370/330; 370/332; 370/333

(58) Field of Classification Search
USPC ................... 455/429, 432.1–453, 456.1–457, 455/509, 524–525; 370/328–334
See application file for complete search history.

(56) References Cited

U.S. PATENT DOCUMENTS

| | | | | |
|---|---|---|---|---|
| 6,434,389 | B1 * | 8/2002 | Meskanen et al. | 455/437 |
| 2005/0249164 | A1 * | 11/2005 | Kwak et al. | 370/335 |
| 2011/0076999 | A1 | 3/2011 | Kazmi et al. | |
| 2011/0136534 | A1 * | 6/2011 | Nanba et al. | 455/522 |

\* cited by examiner

*Primary Examiner* — Dai A Phuong

(57) ABSTRACT

A method of managing communication in a cellular telecommunication network capable of using multiple carrier frequencies includes determining a downlink quality measurement of a primary carrier frequency and determining a downlink quality measurement of at least one secondary carrier frequency. The method also includes generating a combined quality measure based on the downlink quality measurement of the primary carrier frequency and the downlink quality measurement of the at least one secondary carrier frequency. Additionally, the method includes determining whether the combined quality measure fulfills a predetermined condition and, in response to determining that the combined quality measure fulfills the predetermined condition, triggering an event.

17 Claims, 9 Drawing Sheets

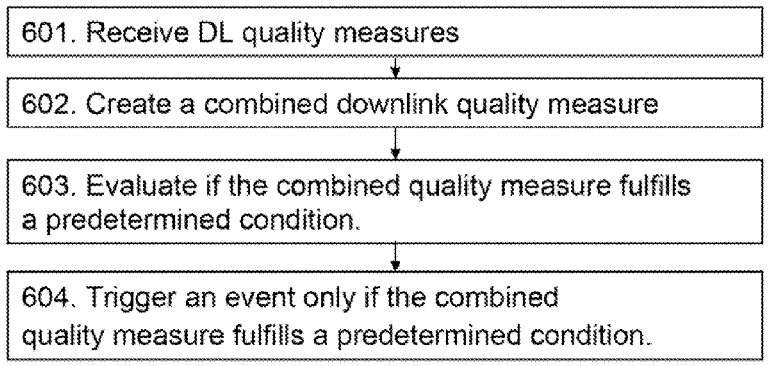
Fig. 6
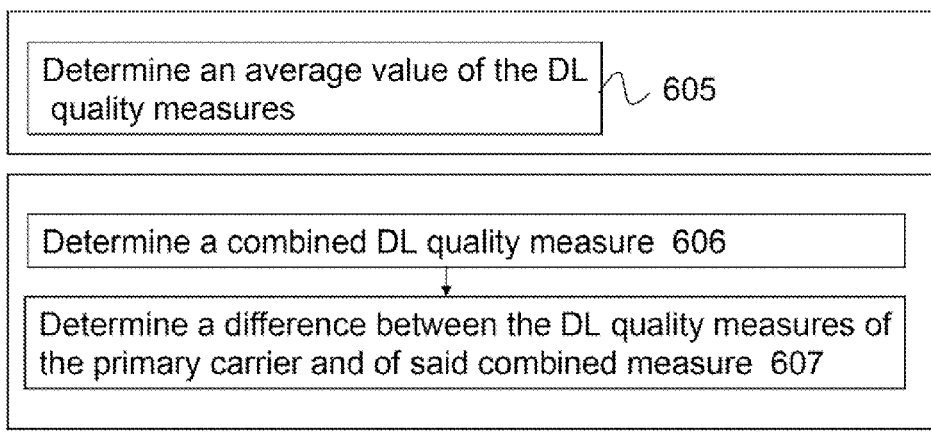
Fig. 7
Fig. 8

METHOD AND ARRANGEMENTS IN A MOBILE COMMUNICATION NETWORK

CLAIMING BENEFIT OF PRIOR FILED U.S. APPLICATION

This application is a continuation of International Application PCT/SE2009/050221, with an international filing date of Feb. 27, 2009, which corresponds to the national-stage entry U.S. patent application Ser. No. 12/996,182, filed Dec. 3, 2010, and which claims the benefit of U.S. Provisional Application No. 61/058,634, filed Jun. 4, 2008. The contents of all of the preceding applications are incorporated by reference herein in their entirety.

TECHNICAL FIELD

The present invention relates to method and arrangements in a mobile communication network, in particular to arrangements allowing for optimizing radio resources utilization in a multicarrier system as well as methods for such optimization.

BACKGROUND

UTRAN (Universal Terrestrial Radio Access Network) is a term identifying the radio access network of a WCDMA based UMTS (Universal Mobile Telecommunications System), wherein the UTRAN consists of Radio Network Controllers (RNCs) 13b and NodeBs 12b i.e. radio base stations as illustrated in FIG. 2. The NodeBs communicate wirelessly with mobile user equipments (UEs) 14b and the RNCs 13b control the NodeBs 12b. The RNCs 13b are further connected to the Core Network (CN) 10b. Evolved UTRAN (E-UTRAN) is an evolution of the UTRAN towards a high-data rate, low-latency and packet-optimised radio access network. Further as illustrated in FIG. 1, the E-UTRAN consists of radio base stations (eNBs) 12a, and the eNBs are interconnected and further connected to the Evolved Packet Core network (EPC) 10a. E-UTRAN is also being referred to as Long Term Evolution (LTE) and is standardized within the 3$^{rd}$ Generation Partnership Project (3GPP). FIG. 1 also shows UEs 14a in communication with the eNBs 12a.

Existing WCDMA (Wideband Code Division Multiple Access) based UTRAN utilize single carrier frequency transmission comprising of 5 MHz in each direction i.e. downlink and uplink. Similarly the E-UTRAN also uses single carrier frequency transmission with a bandwidth which may be between 1.4 MHz to 20 MHz. The evolution of WCDMA towards multicarrier WCDMA and of E-UTRAN to LTE advanced comprising multicarrier transmission is underway. Hence this ongoing evolution is the possibility of transmitting data over more than one carrier at a time. One of the fundamental objectives of this evolution is to enhance data rate per user while still maintaining robust mobility performance. Therefore the introduction of additional carriers also requires certain level of modification in the mobility principles and radio resource management algorithms controlling the mobility.

In WCDMA single carrier system the following three downlink neighbour cell measurements are specified primarily for mobility purpose; CPICH RSCP (Common Pilot Channel Received Signal Code Power), CPICH Ec/No; CPICH Ec/No=CPICH RSCP/carrier RSSI (Received signal strength indicator) and UTRA Carrier RSSI.

The RSCP is measured by the UE on cell level basis on the common pilot channel (CPICH) and the UTRA carrier RSSI is measured over the entire carrier. The UTRA carrier RSSI is the total received power and noise from all cells (including serving cells) on the same carrier. The above mentioned CPICH measurements are the main quantities used for the mobility decisions.

In E-UTRAN the following three downlink neighbour cell measurements are specified also primarily for mobility purpose; Reference symbol received power (RSRP), Reference symbol received quality (RSRQ): RSRQ=RSRP/carrier RSSI and E-UTRA Carrier RSSI.

The RSRP or RSRP part in RSRQ in E-UTRAN is solely measured by the UE on cell level basis on reference symbols. As in case of WCDMA, the E-UTRA carrier RSSI is measured over the entire carrier. It is also the total received power and noise from all cells (including serving cells) on the same carrier. The two RS based measurements are indeed also the main quantities, which are likely to be used for the mobility decisions.

In cdma2000 1xRTT system and in cdma2000 HRPD system the pilot strength is specified for quality measurement for mobility. In Wimax IEEE 802.16 systems, WiMAX Preamble CINR and WiMAX RSSI are used for mobility measurements.

WiMax Preamble CINR is the Carrier to Interference and Noise ratio of the WiMAX DL preamble measured by the UE for a particular BS. This measurement quantity provides information on the actual operating condition of the receiver, including interference and noise levels, and signal strength. It therefore depicts the cell quality and is analogous to RSRQ and CPICH Ec Carrier to Interference and Noise ratio/No in E-UTRAN and WCDMA respectively.

Wimax RSSI is the Received Signal Strength measured by the UE from the DL preamble for a particular base station. It corresponds to signal strength measurements (i.e. RSCP or RSRP) in WCDMA or E-UTRAN.

The neighbour cell measurements are typically averaged over long time period in the order of 200 ms or even longer to filter out the effect of fast fading.

There is also a requirement on the UE to measure and report the neighbour cell measurements (e.g. RSRP and RSRQ in E-UTRAN) from a certain minimum number of cells. In both WCDMA and E-UTRAN this number is 8 cells comprising of one serving and seven neighbour cells on the serving carrier frequency or commonly termed as intra-frequency.

CPICH Ec/No and RSRQ are the so-called neighbour cell quality measurements used in WCDMA and E-UTRAN respectively. The explanation is also valid for quality measurements in other systems e.g. WiMax Preamble CINR in Wimax system.

The goal of the neighbour cell quality measurement is to estimate and predict the long term downlink quality that may be experienced by the UE in a particular cell. It should indeed indicate the signal quality or throughput that the UE will achieve in a cell. This prediction enables the UE and the network to choose the most appropriate cell when performing cell reselection and handovers respectively. In E-UTRAN any set of resource blocks (i.e. part of the cell bandwidth) may be assigned to the UE for transmission.

In multicarrier system like in multicarrier WCDMA the overall average and long term quality prediction of all or a sub-set of carriers is important to be known prior to handover or cell reselection.

In both WCDMA (HSDPA) and E-UTRAN, the UE reports a channel quality indicator (CQI), which is expected to depict the instantaneous channel quality. Furthermore CQI is only reported from the serving cell. Therefore the purpose of CQI is to track fast fading and is mainly used for scheduling and link adaptation at the base station. In current HSDPA system only one CQI is reported at a time since there is a single carrier in the downlink and uplink. In E-UTRAN system, the UE may be configured to report the CQI over a part of bandwidth to be able to do frequency domain scheduling.

As stated above, mobility decisions (i.e. cell reselection and handovers related) require long term averaged downlink quality. For the purpose of mobility, the network usually uses neighbour cell quality measurement quantity (i.e. CPICH Ec/No in WCDMA or RSRQ in E-UTRAN). However the use of CQI for mobility decisions is not precluded. For instance the network may filter the CQI to alleviate the effect of fading and use it for mobility aspects e.g. starting or stopping of measurement gaps for inter-frequency measurements.

There are basically two kinds of mobility scenario; Idle mode mobility with cell reselection and connected mode mobility with handover.

The cell reselection is mainly a UE autonomous function without any direct intervention of the network until the change of serving cell has already been performed. However, to some extent the UE behaviour in this mobility scenario could still be controlled by some broadcasted system parameters and performance specification. The handover on the other hand, is fully controlled by the network through explicit UE specific commands and by performance specification.

In both idle and connected modes the mobility decisions are mainly based on the same kind of downlink neighbour cell measurements, which were discussed in the previous section.

Both WCDMA and E-UTRAN are frequency reuse-1 systems. This means the geographically closest or physical adjacent neighbour cells operate on the same carrier frequency. An operator may also deploy multiple frequency layers within the same coverage area. Therefore, idle mode and connected mode mobility in both WCDMA and E-UTRAN could be broadly classified into three main categories: Intra-frequency mobility (idle and connected modes), Inter-frequency mobility (idle and connected modes) and Inter-RAT mobility (idle and connected modes).

In intra-frequency mobility, the UE moves between the cells belonging to the same carrier frequency. This is the most important mobility scenario since it involves less cost in terms of delay as neighbour cells are monitored continuously i.e. not in measurement gaps. The gap assisted measurements as done for inter-frequency mobility involve relatively longer delay compared to those for intra-frequency mobility. In addition, an operator would have at least one carrier at its disposal that it would like efficiently utilize.

In inter-frequency mobility the UE moves between cells belonging to different carrier frequencies but of the same access technology.

In inter-RAT mobility, the UE moves between cells that belong to different access technologies such as between WCDMA and GSM or vice versa.

In order to reduce signalling overheads the UE may be configured to report an event when certain conditions are met. Alternatively the UE will have to report the measurements on serving and neighbour cells continuously.

These reported events are used by the network to take mobility related decisions in connected mode. Furthermore the same event may be reported according to signal strength measurement (e.g. RSRP) or signal quality measurement (e.g. RSRQ) or both as configured by the network. In addition an event may be absolute based on single cell or relative based on comparison between 2 cells (generally between serving and neighbour cells). Typically one or more events are configured and associated thresholds or other parameters are signaled to a UE.

In UTRAN systems some example of events are: Reporting event 1A: A Primary CPICH enters the reporting range, Reporting event 1B: A primary CPICH leaves the reporting range, Reporting event 1C: A non-active primary CPICH becomes better than an active primary CPICH, Reporting event 1D: Change of best cell, Reporting event 1E: A Primary CPICH becomes better than an absolute threshold, and Reporting event 1F: A Primary CPICH becomes worse than an absolute threshold.

Similar events are also specified in other systems. For instance in E-UTRAN the mobility related events are specified in 3GPP TS 36.331 "Evolved Universal Terrestrial Radio Access (E-UTRA); Radio Resource Control (RRC); Protocol specification".

In idle mode no events are reported to the network, but the same measurements may be used for cell reselection as stated above. The parameters are signaled by the network on the broadcast channel. The cell reselection algorithm, which are in some sense analogous to events in connected mode, are specified in the standard to ensure well defined UE behaviour (see e.g. 3GPP TS 25.304 "User Equipment (UE) procedures in idle mode and procedures for cell reselection in connected mode" for UTRAN and 3GPP TS 36.304 "Evolved Universal Terrestrial Radio Access (E-UTRA); User Equipment (UE) procedures in idle mode" for E-UTRAN).

In multicarrier systems at least more than one carrier is used in the downlink. One of the multi carriers is called anchor carrier and remaining ones are called supplementary carriers. Other terminologies used in literature for anchor and supplementary carriers are primary and secondary carriers respectively. However, the terminology primary carrier and secondary carrier is used in the remaining description.

The primary carrier contains all physical channels including all common control channels. The secondary carriers may or may not contain all physical channels; for instance it may lack some common control channels. The primary carrier in downlink and in uplink (i.e. if there is more than one carrier in uplink) should work according to legacy operation. Note that legacy operation is based on single carrier.

For instance the UE in dual cell HSDPA (DC-HSDPA) operation, which is being currently specified, is able to simultaneously receive HSDPA traffic over two downlink carrier frequencies. They are also transmitted in the same frequency band from a single serving sector. There is one uplink carrier for a DC-HSDPA UE and it is not strictly tied to one of the two downlink carriers. In DC-HSDPA UE primary carrier has all the physical channels including DPCH/F-DPCH, E-HICH, E-AGCH, and E-RGCH. During dual carrier operation in CELL_DCH, the UE secondary carrier is the downlink carrier which is not the UE primary carrier.

In legacy system with single carrier in the downlink the quality based mobility decision are obviously based on the quality estimated on one carrier. In multicarrier systems e.g. in DC-HSDPA, the quality on each carrier may be different due to different interference, adjacent channel interference and noise levels experienced by the UE. The difference in interference is for example due to different level of co-channel interference sources. The difference in noise level is considerably influenced by the frequency band e.g. different carriers may belong to different bands, which may have different sensitivity levels. Nevertheless the co-channel interference remains the dominant factor, which would distinguish the downlink neighbour cell quality on different carriers. Therefore to ensure robust quality based mobility performance the downlink quality on all or at least sub-set of carriers in a set of multicarrier should be taken into consideration in multicarrier system.

The other important family of measurement quantities used for mobility is signal strength based e.g. RSRP in E-UT-RAN. This category of mobility measurement is independent of any type of co-channel interference. Therefore signal strength based measurement quantity and the corresponding events, from anchor carrier are likely to be sufficient.

The simplest solution is that all mobility based decisions in idle and connected mode are solely based on measurements and events from the primary carrier. The drawback is that this solution does not take into consideration the downlink quality of the secondary carriers, which are though used for transmitting data. Thus in practice the UE could enter or be handed over to a set of multicarrier cell, which do not provide sufficient overall quality when transmitting data. There will be overall loss in user performance e.g. lower than the bit rate envisaged in a multicarrier setup. Therefore full potential of multicarrier system may not always be realizable.

Another solution is that mobility decisions take into account measurements and events from primary as well as secondary carriers. For instance either AND or OR operation could be performed on individual events to generate one aggregate event before deciding to perform handover. Though this solution depicts quality on all carriers in a multicarrier system but the obvious flaw is in terms of increase in the number of measurements and events, which are performed by the UE. On the one hand it increases UE complexity and on the other hand it will increase uplink signalling load and will require more complex processing at the network. The complexity and signalling load will explode with the increase in the number of supplementary carriers. The number of carriers in multicarrier systems (HSPA, IMT-advanced etc) is expected to rise sharply to satisfy the increasing demand of high data rate.

Therefore a solution is needed that provide a reasonable tradeoff between various factors: system complexity, UE complexity, signalling overheads, accuracy of quality measurements etc. in a multicarrier system.

SUMMARY

The objective of the present invention is hence to achieve a reliable resource efficient solution for triggering different events.

The quality measurement should capture the overall long term average quality over the entire bandwidth or at least over the largest possible portion of the bandwidth. Thus, the basic idea of the present invention is that events are triggered based on a composite downlink channel quality of all or a sub-set of downlink carriers involving the primary carrier and at least one secondary carrier.

According to a first aspect of the present invention a method in a node of cellular telecommunication network is provided. The cellular telecommunication network is capable of simultaneously using multiple carrier frequencies comprising a primary carrier frequency and at least one secondary carrier frequency. In the method, downlink quality measurements of the primary carrier frequency and of at least one secondary carrier frequency are received. The received downlink quality measurements of the primary carrier frequency and of the at least one secondary carrier frequency are combined to determine a combined quality measure. It is further evaluated if the combined quality measure fulfills a predetermined condition, and an event is triggered only if the combined quality measure fulfills a predetermined condition.

The method may be carried out by a UE or by a network node. If the method is carried out by the UE, the step of receiving downlink quality measurements of the primary carrier frequency and of at least one secondary carrier frequency comprises that the UE measures the downlink quality measurements on control information sent from one or more base stations. If the method is carried out by the network node, the UE performs the downlink measurements and sends measurements reports to the network node. Accordingly, the network node receives the downlink quality measurements and combines and evaluates whether an event should be triggered.

Thus, according to a second aspect a network node of a cellular telecommunication network is provided. The cellular telecommunication network is capable of simultaneously using multiple carrier frequencies comprising a primary carrier frequency and at least one secondary carrier frequency. The network node comprises a receiver for receiving downlink quality measurements of the primary carrier frequency and of at least one secondary carrier frequency, a combining unit for combining the received downlink quality measurements of the primary carrier frequency and of the at least one secondary carrier frequency to determine a combined quality measure, and an evaluation unit for evaluating whether the combined quality measure fulfills a predetermined condition. Moreover, the network node comprises a triggering unit for triggering an event, wherein the event is triggered only if the combined quality measure fulfills a predetermined condition.

According to a third aspect of the present invention, a UE connectable to the cellular telecommunication network is provided. The UE comprises a measuring unit for measuring downlink quality measurements of the primary carrier frequency and of at least one secondary carrier frequency, a combining unit for combining the measured downlink quality measurements of the primary carrier frequency and of the at least one secondary carrier frequency to determine a combined quality measure. The UE further comprises an evaluation unit for evaluating whether the combined quality measure fulfills a predetermined condition, and a triggering unit for triggering an event only if the combined quality measure fulfills a predetermined condition.

The embodiments lead to reduction in overall events but at the same time would also depict overall multicarrier quality, which is desired for robust and reliable mobility decisions.

The proposed solutions are applicable to any multicarrier system, e.g. WCDMA, cdma2000, Wimax etc., or long-term evolution of the UTRAN.

With the proposed solution, the downlink neighbour cell quality estimation in multicarrier system is improved.

Signalling overheads are reduced due to fewer events in multicarrier system while the reported events still depict the overall quality on all or sub-set of carriers.

The solution is less complex for both UE and network compared to the case where an event is evaluated and reported for each carrier in a multicarrier system.

The overall system performance is improved due to better cell reselection and handover evaluation criteria, which take into consideration the overall quality in multicarrier system.

Other objects, advantages and novel features of the present invention will become apparent from the following detailed description when considered in conjunction with the accompanying drawings and claims.

BRIEF DESCRIPTION OF THE DRAWING

For a better understanding, reference is made to the following drawing and preferred embodiments of the invention.

FIGS. 4-10 are flowcharts illustrating methods according to embodiments of the present invention.

DETAILED DESCRIPTION

According to embodiments of the present invention, the communication system is herein described as a WCDMA or an LTE communication system. The skilled person, however, realizes that the inventive method and arrangements work very well on other communications systems as well, such as a cdma2000 system, or Wimax system. The user equipments may be mobile stations such as mobile telephones ("cellular" telephones) and laptops with mobile termination and thus may be, for example, portable, pocket, hand-held, computer-included or car-mounted mobile devices which communicate voice and/or data with the RAN.

In one of the state of the art solutions the measurement quality and corresponding events are reported for all carriers. This increases signalling overheads. Thus one important objective of the invention is to reduce signalling overheads and UE complexity. Another objective is to ensure that reported measurements and events take into consideration the quality of the primary carrier as well as of all or at least a sub-set of secondary carriers. The main principle of the present invention is that events such as mobility related events and decisions are based on a combined quality measure, also referred to as a composite quality measure, across all or a sub-set of downlink carrier frequencies including the primary downlink carrier frequency. It should be noted that the expressions carrier and carrier frequency are used interchangeably.

The combined quality measure reflects the downlink quality on both the primary carrier frequency and on at least one of the secondary carrier frequencies. The combined quality measure is used to decide whether an event should be triggered in order to avoid the triggering in situations when the events are considered unnecessary. I.e. it is determined whether the combined quality measure fulfills a predetermined condition, and the event is triggered only if the combined quality measure fulfills the predetermined condition.

The combined quality measure refers to an aggregate quality of all or at least sub-set of carrier frequencies, which include the primary carrier frequency and at least one secondary carrier frequency. The aggregation may be represented by an average e.g. arithmetic or geometric or any other statistical measure of the quality measurements on the individual carrier frequencies (including the primary frequency and at least one secondary carrier frequencies.

For quality based mobility decisions neighbour cell quality measurement such as CPICH Ec/No in WCDMA is typically used. However, the CQI which is only measured on the serving cell may also be used for triggering events, serving cell based absolute events, which do not require comparison with neighbour cell quality.

Figure 1:
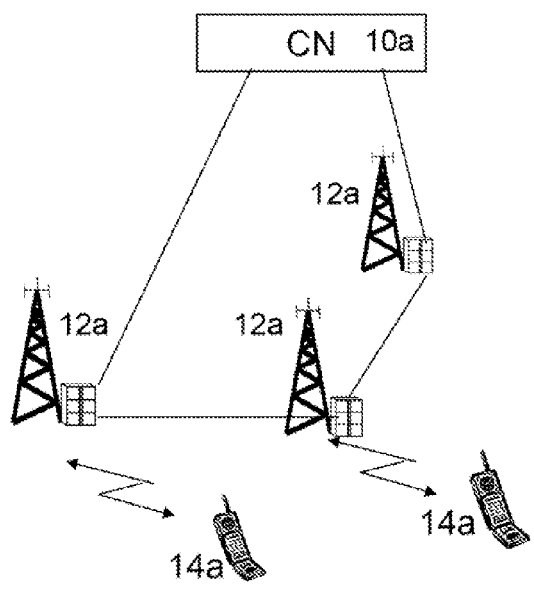
FIGS. 1 and 2 show exemplary communication network architectures wherein the present invention may be implemented.
Figure 2:
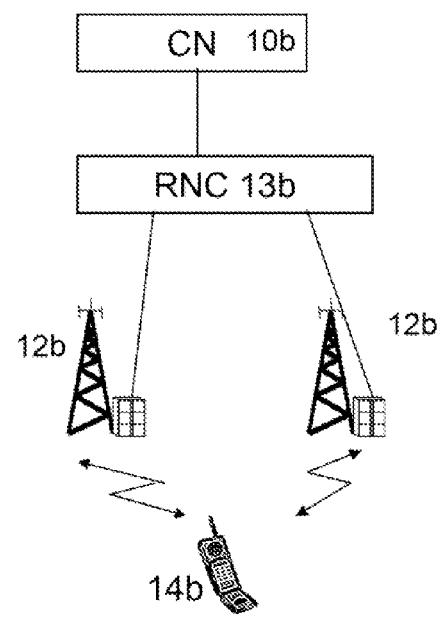
Figure 3:
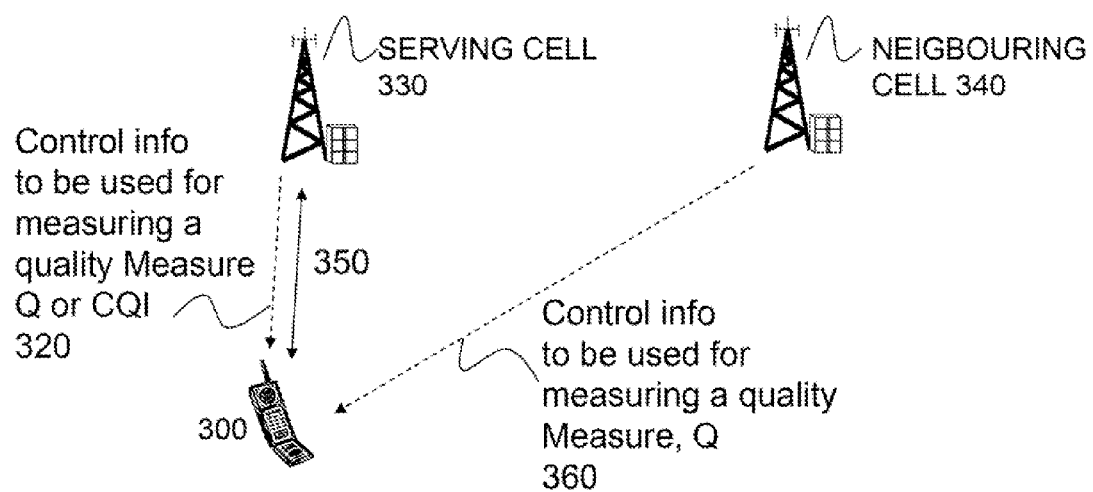
FIG. 3 illustrates a scenario with the control information to be used for determining the composite quality measure according to the embodiments of the present invention.

Two cases are considered; events triggered based on combined carrier CQI measurements and events triggered based on combined Carrier Quality measurements e.g. CPICH Ec/No in WCDMA or RSRQ in E-UTRAN. This is illustrated by FIG. 3 which depicts a scenario with a UE 300 connected 350 to a serving cell 330. Adjacent to the serving cell 330 is a neighbouring cell 340 located. From the serving cell 330, the UE receives control information to be used for measuring CQI and CPICH Ec/No in WCDMA or RSRQ in E-UTRAN. CQI can only be measured on control information 320 from the serving cell 330 while CPICH Ec/No in WCDMA or RSRQ in E-UTRAN, referred to as Q, can be measured on control information 320, 360 from both the serving cell and neighbouring cells.

The CQI reports for each carrier (i.e. the primary and at least one secondary carrier) are reported to the network in existing systems. The CQI depicts an instantaneous downlink quality of a carrier. In E-UTRAN the UE may also be configured to report CQI over a part of the carrier bandwidth often termed as sub-band quality.

Let $CQI_p$ and $CQI_{si}$ denote the CQI measured on the primary carrier frequency and the secondary carrier i respectively. Let $\overline{CQI}$ be an aggregate value, also referred to as combined quality measure, of CQI:s obtained from the CQI reports. The aggregation may be performed at the network since it receives all reports from the UE.

The combined carrier CQI may be estimated by using any suitable mathematical function while giving equal or different weights to the individual CQI of the primary carrier and at least one of the secondary carriers. This is further elaborated by specific examples below:

In this example there are K secondary carriers. Then as an example the aggregated composite CQI ($\overline{CQI}$) is represented by a weighted arithmetic mean as follows:

$$\overline{CQI} = \frac{\alpha_1 CQI_P + \sum_{i=1}^{N} \alpha_i CQI_{Si}}{1+N} \quad (1)$$

Another example of obtaining the combined quality measure may be represented by a geometric mean as follows:

$$\overline{CQI} = \sqrt[N]{\eta_1 CQI_P * \eta_2 CQI_{S1} * ... * \eta_N CQI_{SN}} \quad (2)$$

Where the notations in (1) and (2) are defined as follows:

$N \leq K$ $\alpha_i$ ($\alpha_i \geq 0$) denotes a weighting factor for carrier i in (1).

In case $\alpha_i = 1$; $\forall_i$ all carriers have equal weightage in estimating combined quality (e.g. average quality).

Alternatively, a larger weighting factor may be used for the primary carrier frequency compared to the secondary carrier frequencies in estimating the combined quality measure.

Similarly some of the carriers may be excluded by setting their weighting factors to a zero value in (1).

$\eta_i$ ($\eta_i > 0$) denotes a weighting factor for carrier i in (2).

In case $\eta_i = 1$, $\forall_i$ all carriers have equal weightage in estimating the combined quality (e.g. average quality).

An alternative is to give more weightage to the primary carrier quality in estimating the combined quality measure, which implies that a relatively larger weighting factor may be used for the primary carrier compared to the secondary carriers.

According to a first embodiment an event E1 is defined. The event E1 is triggered if the composite CQI ($\overline{CQI}$) falls below an absolute threshold ($\gamma_1$):

$$\overline{CQI} \leq \gamma_1 \quad (3)$$

This may be an internal event in the network, e.g. the base station. This is an absolute event and may be used by the network to perform one or more radio resource management tasks e.g. to start compressed mode gaps for inter-frequency or inter-RAT measurements or to directly initiate handovers or to combine this event with other traditional events or to combine this with other available information in the network (e.g. cell load or historical performance data) for taking a mobility related decision.

According to a second embodiment an event E2 is defined. The event E2 is triggered if the composite CQI ($\overline{CQI}$) surpasses an absolute threshold ($\gamma 2$):

$$\overline{CQI} \geq \gamma_2 \quad (4)$$

This may be an internal event in the network, e.g. the base station. This may also be an absolute event and may be used to perform one or more radio resource management tasks e.g. to deactivate measurement gaps (compressed mode gaps in WCDMA) previously activated for inter-frequency or inter-RAT measurements or to combine this event with other traditional events or to combine this with other available information in the network (e.g. cell load or historical performance data) for taking a mobility related decision.

Furthermore, the triggering of the events may also be based on a composite carrier quality, referred to as Q, as an alternative to the composite carrier CQI. The main principle is the same as described above in that the composite quality is obtained by using a suitable statistical measure over the neighbour cell quality from all or from a sub-set of carriers, which include the primary carrier and at least one secondary carrier. However, the estimation principle may be slightly different since the composite quality is estimated by the UE instead of the network as the composite carrier CQI. Another difference is that the actual neighbour cell quality rather than CQI is used to derive the composite quality. Since the neighbour cell quality is obtained from serving and neighbour cells, the triggered events from neighbour cells may also be performed by the UE. Furthermore as stated above the composite quality is derived by the UE and also the corresponding triggered events are performed by the UE and may comprise UE reports to the network.

Let $\overline{Q}_C^j$ represent the composite carrier quality measure of a set of multicarrier cells j e.g. an arithmetic average of the neighbour cell qualities (e.g. CPICH Ec/No in WCDMA, RSRQ in E-UTRAN etc) of all or sub-set of carriers. For simplicity a generic term $\overline{Q}_C^j$ is used to represent the composite quality measure, which connotes composite quality in any of the systems e.g. RSRQ in E-UTRAN.

The composite carrier quality may be estimated by using any suitable mathematical function while giving equal or different weights to the individual quality of the primary carrier frequency and the secondary carrier frequencies. This is further elaborated by specific examples below:

In this example there are K secondary carrier frequencies. Then the aggregate or the composite carrier quality ($\overline{Q}_C^j$) in terms of composite CPICH Ec/No in multicarrier WCDMA may be represented by an arithmetic mean as follows:

$$\overline{Q}_C^j = \frac{\beta_1 RSCP_P + \sum_{i=1}^{N} \beta_i RSCP_{Si}}{No_P + \sum_{i=1}^{N} NO_{Si}} \quad (5)$$

Another example of estimating composite quality is expressed in (6):

$$\overline{Q}_C^j = \frac{1}{N+1}\left\{\beta_1\left(\frac{RSCP}{No}\right)_P + \beta_2\left(\frac{RSCP}{No}\right)_{S1} + \ldots + \beta_N\left(\frac{RSCP}{No}\right)_{SN}\right\} \quad (6)$$

Yet another example of obtaining composite quality may be represented by a geometric mean as follows:

$$\overline{Q}_C^j = \sqrt[N]{\varphi_1\left(\frac{RSCP}{No}\right)_P * \varphi_2\left(\frac{RSCP}{No}\right)_{S1} * \ldots * \varphi_N\left(\frac{RSCP}{No}\right)_{SN}} \quad (7)$$

Yet another possibility is that UE estimates the pilot signal strength part (e.g. RSCP in WCDMA) only on the primary carrier frequency and the interference from all the carrier frequencies (i.e. the primary and secondary carrier frequencies) because the interference on each carrier frequency may be different.

Where the notations in (5), (6) and (7) are defined as follows:

$N \leq K$ $\beta_i$ ($\beta_i \geq 0$) denotes a weighting factor for carrier i in (5) and (6).

In case $\beta_i=1$; $\forall_i$ all carriers have equal weightage in estimating composite quality (e.g. average quality).

Alternatively larger weighting factor may be used for the primary carrier frequency in estimating the composite quality.

Similarly, some of the carriers may be excluded by setting their weighting factors to a zero value in (5) or (6), which ever is used.

$\phi_i$ ($\phi_i>0$) denotes a weighting factor for carrier i in (7).

In case $_i=1$; $\forall_i$ all carriers will have equal weightage in estimating the composite quality (e.g. average quality).

Alternatively to give more weightage to the quality of the primary carrier frequency in estimating the composite quality, a relatively larger weighting factor may be used for the primary carrier.

These set of events require modification of the carrier quality measurement definition in the standard. The network should also have means to configure the UE for reporting the events and means to signal the corresponding thresholds. For example, the network should have means to signal to the UE whether all or a sub-set of carrier frequencies and in the latter case which carriers should be used for estimating composite carrier quality and generating triggering of events. Alternatively, a fixed number of carriers to be used for estimating quality and triggering reporting events may also be specified in the standard. The fixed number could be a function of total available carriers, i.e. anchor and all supplementary carriers.

According to a third embodiment an event E3 is defined. The event E3 is triggered if the composite cell quality ($\overline{Q}_C^j$) from set of multicarrier cells j falls below an absolute threshold (μ1):

$$\overline{Q}_C^j \leq \mu_1 \qquad (8)$$

The set of multicarrier cells j may be the serving cell set or neighbour cell set. In fact (8) represents two possible absolute events; one concerns the serving cell set and another concerns the neighbour cell set.

This event may also typically be performed by the UE involving an UE report to the network. The UE report may be used to perform one or more radio resource management tasks e.g. to start compressed mode gaps for inter-frequency or inter-RAT measurements or to directly initiate handover.

According to fourth embodiment an event E4 is defined. The event E4 is triggered if the composite cell quality ($\overline{Q}_C^j$) from set of multicarrier cells j rises above an absolute threshold (μ2):

$$\overline{Q}_C^j \geq \mu_2 \qquad (9)$$

As before a set of multicarrier cells j may either be a serving cell set or neighbour cell set and (9) may represent two different events in practice. That is one event, which is specific to the serving cell set and is triggered when the composite cell quality from set of multicarrier cells j belonging to the serving cell set rises above an absolute threshold. The other event is specific to the neighbouring cell set, when the composite cell quality from set of multicarrier cells j belonging to the neighbour cell set rises above an absolute threshold E4 is typically an event performed by the UE comprising UE reports to the network. These reports may be used by the network to perform one or more radio resource management tasks e.g. to stop compressed mode or other types of gaps used for inter-frequency or inter-RAT measurements.

According to a fifth embodiment an event E5 is defined. The event E5 is triggered if the composite cell quality ($\overline{Q}_C^S$) from set of multicarrier cells S as compared to that ($\overline{Q}_C^M$) of the set of multicarrier cells M falls below a relative threshold (Δ1):

$$\overline{Q}_C^S - \overline{Q}_C^M \leq \Delta_1 \qquad (10)$$

All quantities in (10) are typically expressed in logarithmic scale but other scales are not precluded. If the linear scale would be used it would be a ratio instead of a difference.

In simple words it allows the comparison between two set of multicarrier cells such as the serving cell set and the neighbour cell set.

This event E5 is typically performed by the UE and E5 comprises UE reports to the network. The reports may be used to take actual handover decision as it would indicate poor serving cell quality in relation to that of the target cell.

According to a sixth embodiment an event E6 is defined. The event E6 is triggered if the composite cell quality ($\overline{Q}_C^S$) from set of multicarrier cells S as compared to that ($\overline{Q}_C^M$) of the set of multicarrier cells M increases above a relative threshold (Δ2):

$$\overline{Q}_C^S - \overline{Q}_C^M \geq \Delta_2 \qquad (11)$$

All quantities in (11) are also typically expressed in logarithmic scale but other scales are not precluded. It also allows the comparison between two set of multicarrier cells such as the serving cell sets and neighbour cell sets.

It should be noted that the events E3-E6 are used in connected mode. In idle mode the UE takes autonomous cell reselection decisions but they are based on signal strength and/or signal quality. The explicit events E3-E6 cannot be used by the UE in idle mode for cell reselection in a multicarrier system. However the main principles outlined in events E3-E6 (i.e. based on absolute or relative composite carrier quality) may also be specified for their use in idle mode. In that case for instance the cell reselection algorithms similar to these events (E3-E6) may be specified in the standard. Furthermore, necessary parameters such as the threshold, the number of carriers per multicarrier set to be involved for quality estimation and cell reselection may either be specified in the standard or signaled via broadcast in the serving cell.

According to further embodiments, events are defined where each event is based on both the primary carrier frequency quality and the composite carrier frequency quality. In order to support legacy operation, which uses only single carrier the UE will have to support quality estimation and corresponding events from the primary carrier (i.e. legacy events). Thus this approach does not add any noticeable complexity on top of the composite carrier quality estimation. These embodiments are also likely to give better overall quality of all or sub-set of multicarrier cells in relation to the primary carrier. The embodiments apply to composite quality based on CQI as well as on carrier quality based on traditional neighbour cell measurements. Events based on relative primary carrier to composite carrier CQI and events based on relative primary carrier to composite carrier quality e.g. CPICH Ec/No in WCDMA are further described below.

The composite CQI estimation is based on similar principles as described above in conjunction with the first and second embodiments.

According to a seventh embodiment an event E7 is defined. The event E7 is triggered if the difference between the primary carrier CQI ($\overline{CQI}_P$) and the composite CQI ($\overline{CQI}$) falls below a relative threshold (δ1):

$$\overline{CQI}_P - \overline{CQI} \leq \delta_1 \qquad (12)$$

This is event is performed internally in the network, e.g. the base station. Note that the difference, although this event is for the serving set of multicarrier, is relative in a sense since the primary carrier CQI is compared to the overall composite quality.

Similar to event E1, the reports resulting from the event E7 may also be used by the network to perform one or more radio resource management tasks e.g. to start compressed mode gaps for inter-frequency or inter-RAT measurements or to directly initiate handovers or to combine this event with other traditional events or to combine this with other available information in the network (e.g. cell load or historical performance data) for taking a mobility related decision.

According to an eighth embodiment, an event E8 is defined. The event E8 is triggered if the difference between the anchor CQI ($\overline{CQI}_P$) and the composite CQI ($\overline{CQO}$) increases above a relative threshold (δ2):

$$\overline{CQI}_P - \overline{CQI} \geq \delta_2 \qquad (13)$$

This event may also be performed internally in the base station. Similar to event E2 this one may also be used by the network to perform one or more radio resource management tasks e.g. to stop compressed mode gaps for inter-frequency or inter-RAT measurements.

According to further embodiments events based on relative primary carrier quality. to composite carrier quality are defined. The composite carrier quality estimation is based on similar principles as described above referred to events based on composite carrier quality. The parameters related to the events could be standardized values or signaled to the UE as also described above.

Hence an event E9 is defined where the event E9 is triggered if the difference between the primary carrier quality ($\overline{Q}_P^j$) and the composite cell quality ($\overline{Q}_C^j$) from set of multicarrier cells j falls below a relative threshold ($\phi 1$):

$$\overline{Q}_P^j - \overline{Q}_C^j \leq \phi_1 \qquad (14)$$

All quantities in (14) are typically expressed in logarithmic scale but other scales are not precluded. The set of multicarrier cells j may be the serving set or neighbour set. As before (14) represents two possible absolute events; it may either be triggered from the serving cell set or from the neighbour cell set.

The triggered events comprise UE reports to the network. These events may be used to perform one or more radio resource management tasks e.g. to start compressed mode gaps for inter-frequency or inter-RAT measurements or to directly initiate handover.

Furthermore, an event E10 is defined where the event E9 is triggered if the difference between the primary carrier quality ($\overline{Q}_P^j$) and the composite cell quality ($\overline{Q}_C^j$) from set of multicarrier cells j increases above a relative threshold ($\phi 2$):

$$\overline{Q}_P^j - \overline{Q}_C^j \geq \phi_2 \qquad (15)$$

All quantities in (15) are also typically expressed in logarithmic scale but other scales are not precluded. The set of multicarrier cells j may be the serving cell set or neighbour cell set. As before (15) represents two possible absolute events; it may either be triggered from the serving cell set or from the neighbour cell set.

The triggered events comprise UE reports to the network. These events may be used to perform one or more radio resource management tasks e.g. to stop compressed mode gaps for inter-frequency or inter-RAT measurements or to directly initiate handover.

In addition an event E11 is defined. The event E11 is triggered if the difference between the primary carrier quality ($\overline{Q}_P^S$) and the composite cell quality ($\overline{Q}_C^S$) from set of multicarrier cells S compared to that (difference between $\overline{Q}_P^M$ and $\overline{Q}_C^M$) of another set of multicarrier cells M falls below a relative threshold ($\omega 1$):

$$(\overline{Q}_P^S - \overline{Q}_C^S) - (\overline{Q}_P^M - \overline{Q}_C^M) \leq \omega_1 \qquad (16)$$

All quantities in (16) are typically expressed in logarithmic scale but other scales are not precluded. It also allows the comparison between two set of multicarrier cells e.g. serving cell sets and neighbour cell sets. The events may be used for performing handovers i.e. deciding whether to perform handover to set M or not.

Event E12 is also defined. The event E12 is triggered if the difference between the primary carrier quality ($\overline{Q}_P^S$) and the composite cell quality ($\overline{Q}_C^S$) from set of multicarrier cells S compared to that (difference between $\overline{Q}_P^M$ and $\overline{Q}_C^M$) of another set of multicarrier cells M increases above a relative threshold ($\omega 2$):

$$(\overline{Q}_P^S - \overline{Q}_C^S) - (\overline{Q}_P^M - \overline{Q}_C^M) \geq \omega_2 \qquad (17)$$

All quantities in (17) are also typically expressed in logarithmic scale but other scales are not precluded. It also allows the comparison between two set of multicarrier cells e.g. serving cell sets and neighbour cell sets. The events may be used for performing handovers i.e. deciding whether to perform handover to set M or not.

The events E9-E12 are also triggered and performed in connected mode. In idle mode the UE does not report any event rather takes autonomous cell reselection decisions but they are based on signal strength and/or signal quality. The explicit events E9-E12 cannot be triggered and performed by the UE in idle mode for cell reselection in a multi-carrier system. However the main principles outlined in events E9-E12 (i.e. based on relative primary to composite carrier quality) may also be specified for their use in idle mode. In that case for instance cell reselection algorithms similar to these events (E9-E12) may be specified in the standard. Furthermore, necessary parameters such as threshold, number of carriers per multicarrier set to be involved for quality estimation and cell reselection may either be specified in the standard or signalled via broadcast in the serving cell.

In accordance with the above described embodiments, the composite quality measure may be calculated both in the UE and the network, which implies that the event to be triggered based on that composite quality measure may be a UE event or a network event. If the composite quality measure is based on CQI, then the composite quality measure is typically determined by the network since the UE reports the CQIs to the network in existing system. Furthermore, if the composite quality measure is based on Q, then the composite quality measure is typically determined by the UE and whereby the event is a UE event. However, it is also possible that the UE reports the Q values of each carrier to the network such that the network can calculate the composite quality measure.

Figure 4:
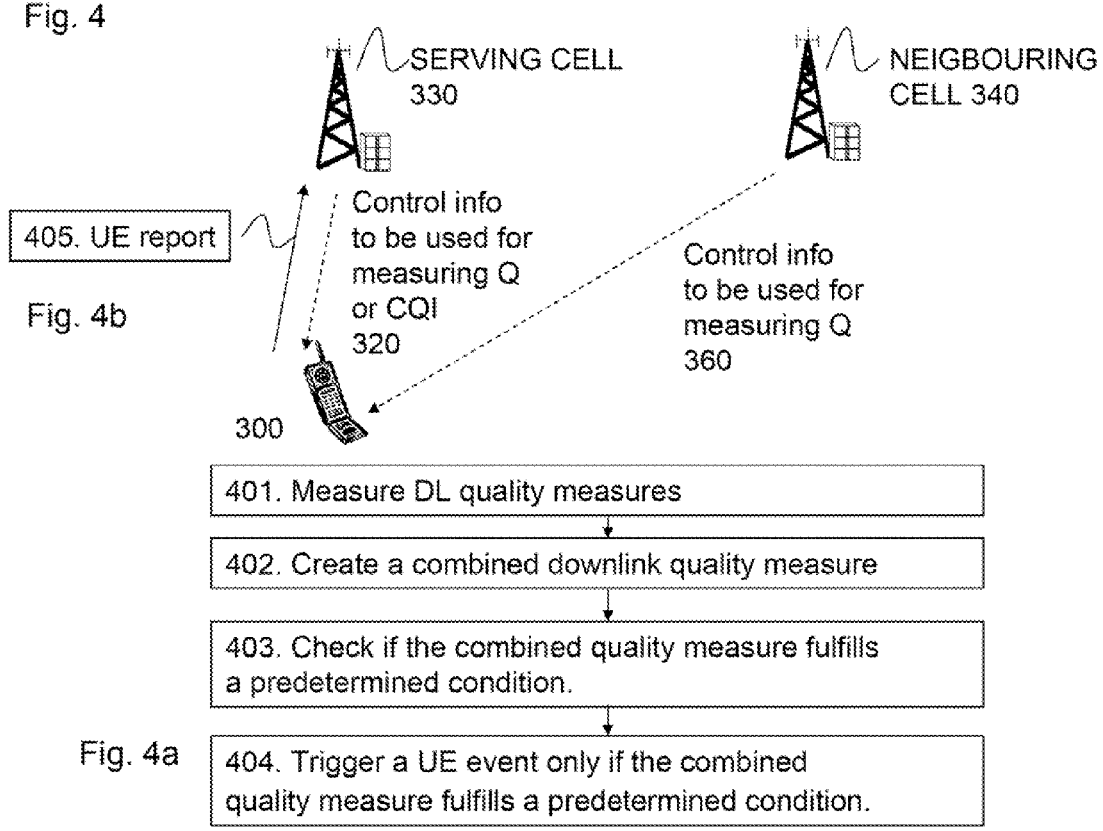

Turning now to FIG. 4, comprising FIG. 4a which illustrates the method of the UE while FIG. 4b illustrates the method of the network node. FIG. 4a is showing the case when a UE 300 measures 401 Q from control information 320, 360 from a set of serving cells 330 and/or from a set of neighbouring cells 340. The UE creates 402 a combined downlink quality measure based on the measured Q. Then, the UE checks 403 if the combined quality measure fulfils a predetermined condition. The predetermined condition may involve a comparison between the combined quality measure and a predefined threshold. If the predetermined condition is fulfilled, an event is triggered 404 at the UE. The event may be a transmission 405 of UE report to the network as illustrated by FIG. 4b.

Figure 5:
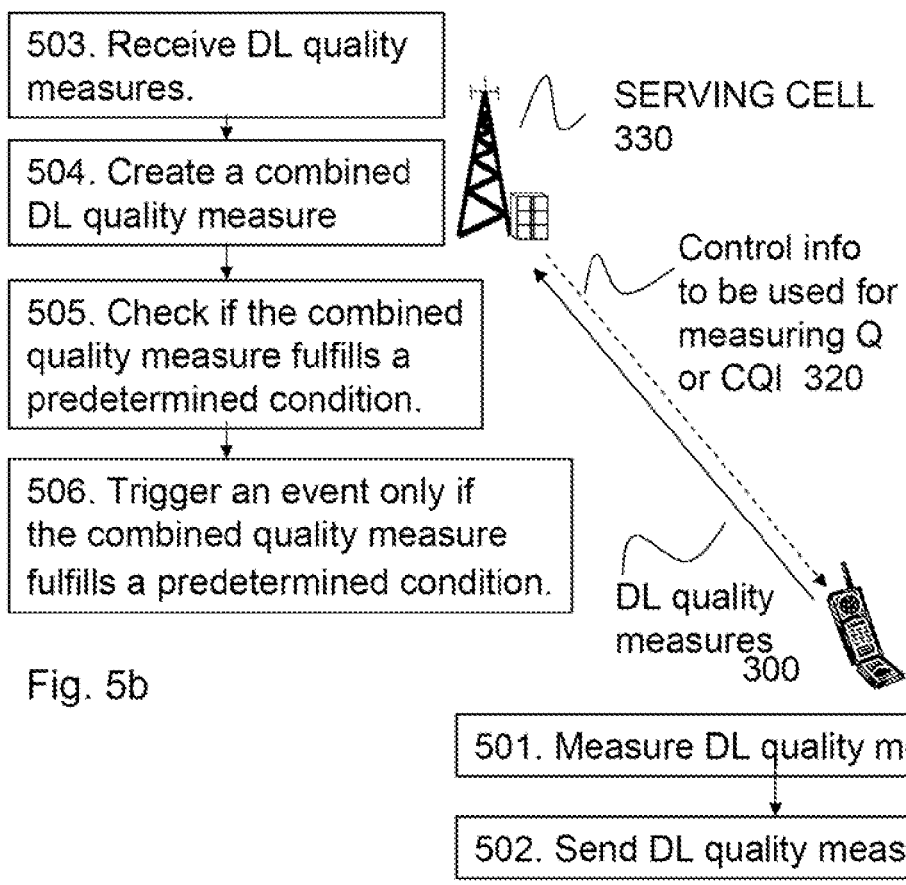

Turning now to FIG. 5 comprising FIG. 5a and FIG. 5b. FIG. 5a illustrates the method of the UE while FIG. 5b illustrates the method of the network node. Hence FIG. 5a is showing the case when a UE 300 measures 501 CQI from control information 320 from a set of serving cells 330. The sends 502 CQI reports, which are received 503 by the network node 330. The network node creates 504 a combined downlink quality measure based on the received CQI reports. Then, the network node checks 505 if the combined quality measure fulfils a predetermined condition. The predetermined condition may involve a comparison between the combined quality measure and a predefined threshold. If the predetermined condition is fulfilled, an event is triggered 506 at the network node. The event may relate to radio resource management such as mobility or handover related actions.

Accordingly, the method according to the present invention is illustrated by the flowchart of FIG. 6. In step 601, downlink quality measurements are received. If the method is carried out of a UE, the downlink quality measurements are received by performing measurements on control information. The combined downlink quality measure, also referred to as composite quality measure, is determined in step 602. It is then evaluated in step 603 whether the combined quality measure fulfills a predetermined condition. If the predetermined condition is fulfilled the event is triggered in step 604.

According to embodiments of the present invention, the combined downlink quality measure is determined by determining an average value of the downlink quality measurements as described above and illustrated by FIG. 7. This can be used for all events E1-E12 as described above.

According to further embodiments, as illustrated by FIG. 8 and as previously described in conjunction with the events E7, E8, E9 and E10, the combined quality measure to be used for triggering an event is determined by determining a first combined downlink quality measure based on Q or CQI measurements in step 606, and then determining a difference between the downlink quality measures of the primary carrier and of said combined measure in step 607.

Figure 9:
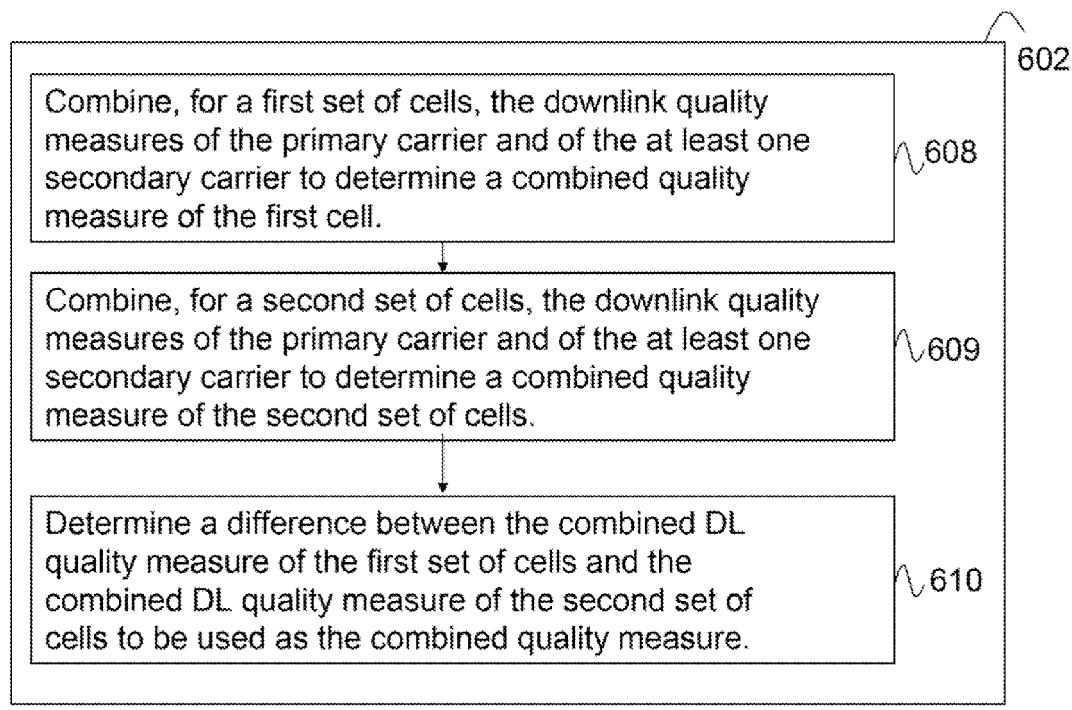

According to further embodiments, as illustrated by FIG. 9 and as previously described in conjunction with the events E5 and E6, the combined quality measure to be used for triggering an event is determined by performing the following steps:

608. Combine, for a first set of cells, the downlink quality measures of the primary carrier and of the at least one secondary carrier to determine a combined quality measure $\overline{Q_C^S}$ of the first cell.

609. Combine, for a second set of cells, the downlink quality measures of the primary carrier and of the at least one secondary carrier to determine a combined quality measure $\overline{Q_C^M}$ of the second set of cells.

610. Determine a difference $\overline{Q_C^S}-\overline{Q_C^M}$ between the combined DL quality measure of the first set of cells and the combined DL quality measure of the second set of cells to be used as the combined quality measure.

Figure 10:
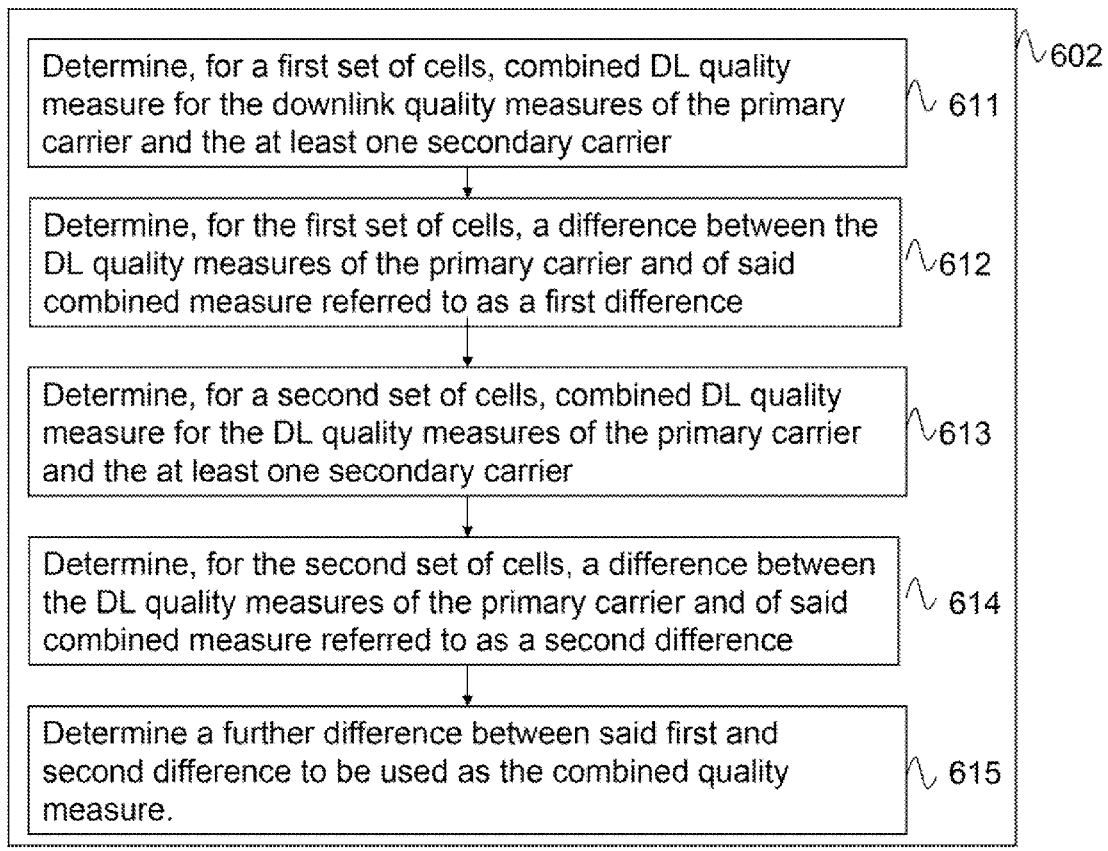

According to yet further embodiments, as illustrated by FIG. 10 and as previously described in conjunction with the events E11 and E12, the combined quality measure to be used for triggering an event is determined by performing the following steps:

611. Determine, for a first set of cells, combined DL quality measure $\overline{Q_C^S}$ for the downlink quality measures of the primary carrier and the at least one secondary carrier.

612. Determine, for the first set of cells, a difference between the DL quality measures of the primary carrier $\overline{Q_P^S}$ and of said combined measure $\overline{Q_C^S}$ referred to as a first difference $(\overline{Q_P^S}-\overline{Q_C^S})$.

613. Determine, for a second set of cells, combined DL quality measure $\overline{Q_C^M}$ for the DL quality measures of the primary carrier and the at least one secondary carrier.

614. Determine, for the second set of cells, a difference between the DL quality measures of the primary carrier and of said combined measure referred to as a second difference ($\overline{Q_P^M}-\overline{Q_C^M}$).

615. Determine a further difference between said first and second difference to be used as the combined quality measure, $(\overline{Q_P^S}-\overline{Q_C^S})-(\overline{Q_P^M}-\overline{Q_C^M})$.

The methods described above may be carried out by an arrangement located either in a UE or in a network node. Therefore, the embodiments of the present invention are directed to a UE and to a network node such as a radio base station.

The radio base station may be a Node B in a UTRAN or an eNode B in E-UTRAN.

Figure 11:
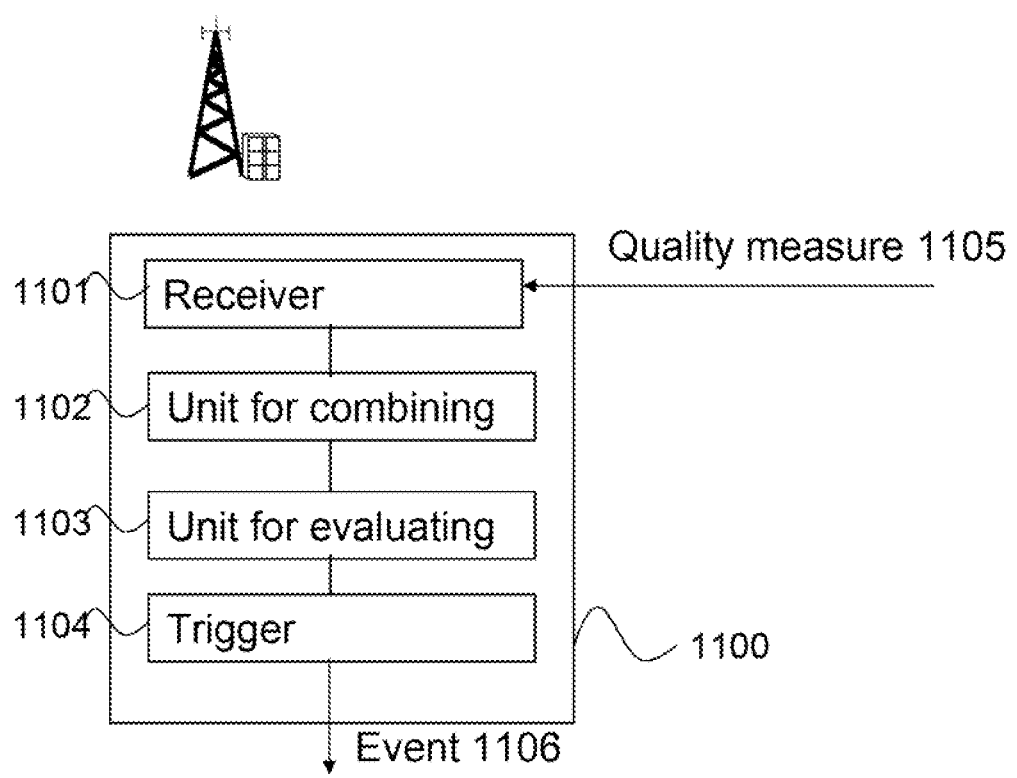
FIG. 11 is a block diagram schematically illustrating a network node according to embodiments of the present invention.
Figure 12:
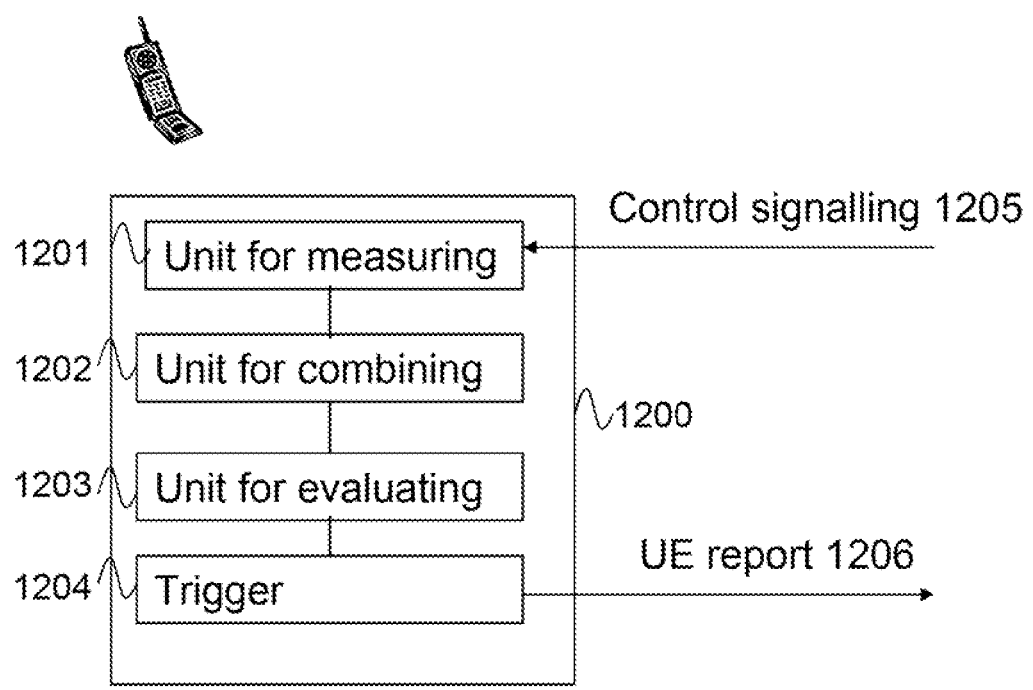
FIG. 12 is a block diagram schematically illustrating a User Equipment according to embodiments of the present invention.

Accordingly, the network node comprises as illustrated in FIG. 11, a receiver 1101 for receiving downlink quality measurements 1105 of the primary carrier frequency and of at least one secondary carrier frequency. It further comprises a combining unit 1102 for combining the received downlink quality measurements of the primary carrier frequency and of the at least one secondary carrier frequency to determine a combined quality measure. An evaluation unit 1103 for evaluating whether the combined quality measure fulfills a predetermined condition is provided and as well as a triggering unit 1104 for triggering an event 1106 only if the combined quality measure fulfills a predetermined condition.

Furthermore, the UE comprises a measuring unit 1201 for measuring downlink quality measurements of the primary carrier frequency and of at least one secondary carrier frequency by measuring control information 1205 sent on the primary carrier frequency and the at least one secondary carrier frequency. It also comprises a combining unit 1202 for combining the measured downlink quality measurements of the primary carrier frequency and of the at least one secondary carrier frequency to determine a combined quality measure. In addition, an evaluation unit 1203 for evaluating whether the combined quality measure fulfills a predetermined condition is provided and a triggering unit 1204 for triggering an event only if the combined quality measure fulfills a predetermined condition. The event may be a transmission of a UE report 1206.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

Expressions such as "including", "comprising", "incorporating", "consisting of", "have", "is" used to describe the present invention are intended to be construed in a non-exclusive manner, namely allowing for items, components or elements not explicitly described also to be present. Reference to the singular is also to be construed to relate to the plural and vice versa.

The invention claimed is:

1. A method of managing communication in a cellular telecommunication network capable of using multiple carrier frequencies including a primary carrier frequency and at least one secondary carrier frequency, wherein the method comprises:
   determining a downlink quality measurement of a primary carrier frequency for a first set of one or more cells;
   determining a downlink quality measurement of at least one secondary carrier frequency for the first set of cells;
   determining a downlink quality measurement of the primary carrier frequency for a second set of one or more cells;
   determining a downlink quality measurement of the at least one secondary carrier frequency for the second set of cells;
   combining the downlink quality measurement of the primary carrier frequency and the downlink quality measurement of the at least one secondary carrier frequency to generate a combined quality measure based on the downlink quality measurement of the primary carrier frequency for the first set of cells, the downlink quality measurement of the at least one secondary carrier frequency for the first set of cells, the downlink quality measurement of the primary carrier frequency for the second set of cells and the downlink quality measurement of the at least one secondary carrier frequency for the second set of cells;

determining whether the combined quality measure fulfills a predetermined condition; and in response to determining that the combined quality measure fulfills the predetermined condition, triggering an event.

2. The method of claim 1, wherein generating the combined quality measure comprises determining an average value of the downlink quality measurement of the primary carrier frequency and the downlink quality measurement of the at least one secondary carrier frequency.

3. The method of claim 1, wherein generating the combined downlink quality measure comprises determining a difference in logarithmic scale between the downlink quality measurement of the primary carrier frequency and the downlink quality measurement of the at least one secondary carrier frequency.

4. The method of claim 1, wherein
determining a downlink quality measurement of the primary carrier frequency comprises measuring a downlink quality of the primary carrier frequency; and
determining a downlink quality measurement of the at least one secondary carrier frequency comprises measuring a downlink quality of the at least one secondary carrier frequency.

5. The method of claim 1, wherein
determining a downlink quality measurement of the primary carrier frequency comprises receiving a downlink quality measurement of the primary carrier frequency; and
determining a downlink quality measurement of the at least one secondary carrier frequency comprises receiving a downlink quality measurement of the at least one secondary carrier frequency.

6. The method of claim 1, wherein triggering an event comprises triggering a reporting of the combined downlink quality measure to a network node.

7. The method of claim 1, wherein triggering an event comprises triggering a cell reselection.

8. A network node of a cellular telecommunication network capable of using multiple carrier frequencies including a primary carrier frequency and at least one secondary carrier frequency, wherein the network node comprises:
a receiver configured to:
receive a downlink quality measurement of a primary carrier frequency for a first set of one or more cells;
receive a downlink quality measurement of at least one secondary carrier frequency for the first set of cells;
determine a downlink quality measurement of the primary carrier frequency for a second set of one or more cells; and
determine a downlink quality measurement of the at least one secondary carrier frequency for the second set of cells;
a combining unit configured to combine the downlink quality measurement of the primary carrier frequency and the downlink quality measurement of the at least one secondary carrier frequency to generate a combined quality measure based on the downlink quality measurement of the primary carrier frequency for the first set of cells, the downlink quality measurement of the at least one secondary carrier frequency for the first set of cells, the downlink quality measurement of the primary carrier frequency for the second set of cells and the downlink quality measurement of the at least one secondary carrier frequency for the second set of cells; and
an evaluation unit configured to:
determine whether the combined quality measure fulfills a predetermined condition; and
in response to determining that the combined quality measure fulfills the predetermined condition, trigger an event.

9. The network node of claim 8, wherein the combining unit is configured to generate the combined quality measure by determining an average value of the downlink quality measurement of the primary carrier frequency and the downlink quality measurement of the at least one secondary carrier frequency.

10. The network node of claim 8, wherein the combining unit is configured to generate the combined downlink quality measure by determining a difference in logarithmic scale between the downlink quality measurement of the primary carrier frequency and the downlink quality measurement of the at least one secondary carrier frequency.

11. The network node of claim 8, wherein the evaluation unit is configured to trigger an event by triggering a cell reselection.

12. The network node of claim 8, wherein the evaluation is configured to trigger an event by triggering a reporting by a mobile terminal.

13. A mobile terminal for capable of using multiple carrier frequencies including a primary carrier frequency and at least one secondary carrier frequency, wherein the mobile terminal comprises:
a measuring unit configured to:
measure a downlink quality of a primary carrier frequency for a first set of one or more cells;
measure a downlink quality of at least one secondary carrier frequency for the first set of cells;
measure a downlink quality measurement of the primary carrier frequency for a second set of one or more cells; and
measure a downlink quality of the at least one secondary carrier frequency for the second set of cells;
a combining unit configured to combine the downlink quality measurement of the primary carrier frequency and the downlink quality measurement of the at least one secondary carrier frequency to generate a combined quality measure based on the downlink quality measurement of the primary carrier frequency for the first set of cells, the downlink quality measurement of the at least one secondary carrier frequency for the first set of cells, the downlink quality measurement of the primary carrier frequency for the second set of cells and the downlink quality measurement of the at least one secondary carrier frequency for the second set of cells; and
an evaluation unit configured to:
determine whether the combined quality measure fulfills a predetermined condition; and
in response to determining that the combined quality measure fulfills the predetermined condition, trigger an event.

14. The mobile terminal of claim 13, wherein the combining unit is configured to generate the combined quality measure by determining an average value of the downlink quality measurement of the primary carrier frequency and the downlink quality measurement of the at least one secondary carrier frequency.

15. The mobile terminal of claim 13, wherein the combining unit is configured to generate the combined downlink quality measure by determining a difference in logarithmic scale between the downlink quality measurement of the primary carrier frequency and the downlink quality measurement of the at least one secondary carrier frequency.

16. The mobile terminal of claim 13, wherein the evaluation unit is configured to trigger an event by triggering a reporting of the combined downlink quality measure to a network node.

17. The mobile terminal of claim 13, wherein the evaluation unit is configured to trigger an event by triggering a cell reselection.

* * * * *

UNITED STATES PATENT AND TRADEMARK OFFICE
CERTIFICATE OF CORRECTION

PATENT NO. : 8,543,129 B2
APPLICATION NO. : 13/400285
DATED : September 24, 2013
INVENTOR(S) : Kazmi et al.

It is certified that error appears in the above-identified patent and that said Letters Patent is hereby corrected as shown below:

In the Specification

In Column 7, Line 1, delete "DRAWING" and insert -- DRAWINGS --, therefor.

In Column 8, Line 64, delete "$\eta_i=1$," and insert -- $\eta_i=1;_i$ --, therefor.

In Column 10, Line 52, delete "$_i=1;$" and insert -- $\varphi_i=1;_i$ --, therefor.

In Column 12, Line 56, delete "$\overline{(CQO)}$," and insert -- $\overline{(CQI)}$ --, therefor.

In Column 12, Line 66, delete "quality. to" and insert -- quality to --, therefor.

Signed and Sealed this
Twenty-second Day of July, 2014

Michelle K. Lee
*Deputy Director of the United States Patent and Trademark Office*